3,122,481
LIPSTICK
Minna Wotzilka and Ruth Samel, London, England, assignors to Ernest Norland, London, England
No Drawing. Filed Oct. 22, 1956, Ser. No. 617,213
Claims priority, application Great Britain Aug. 7, 1956
1 Claim. (Cl. 167—85)

This invention consists in a lipstick composition comprising carboxymethyl cellulose and/or a water-soluble cellulose ether, a dyestuff and/or a pigment, and preferably also a water-soluble plasticiser. The composition may conveniently be made by gelatinizing the cellulose compound with water, and blending with the plasticiser, and pigment and/or dyestuff.

The invention also consists in lipsticks made with the above-mentioned composition. The latter may be extruded or sheeted whilst softened with water, and then dried, suitably with warm air. The lipsticks may be cut from the sheet or extruded rod before or after drying.

Lipsticks in accordance with this invention have the advantage of being sufficiently high melting to be stable at tropical temperatures and to be useable without a special holder. By application to the moistened lips a coating is formed which on drying, will not smear. Further, because the lipsticks may be made in rigid, form-stable shapes, great accuracy in application may be achieved. They also have the advantage of resistance to mycological attack.

By way of example, a lipstick composition may be made with 30 parts by weight of methyl cellulose, 150 parts of water, 3 parts of polyethylene glycol 4000, and 10 parts of rhodamine B.

We claim:
A solid lipstick comprising a dried, aqueously gelatinized composition of about 30 parts of methyl cellulose, 3 parts of polyethylene glycol 4000, and 10 parts of rhodamine B.

References Cited in the file of this patent

UNITED STATES PATENTS

| | | |
|---|---|---|
| 2,230,063 | Klimist | Jan. 28, 1941 |
| 2,484,637 | Mattocks et al. | Oct. 11, 1949 |
| 2,550,622 | Taub | Aug. 24, 1951 |
| 2,577,921 | Samel et al. | Dec. 11, 1951 |
| 2,726,982 | Ochs | Dec. 13, 1955 |

FOREIGN PATENTS

| | | |
|---|---|---|
| 686,444 | Great Britain | Jan. 28, 1953 |

OTHER REFERENCES

Lesser: Drug and Cos. Ind. 62:6, June 1948, pp. 750–752, 830–832.

Davies: Soap, Perfumery and Cosmetics 21:7, July 1948, pp. 684–686.

Swintosky: J. Amer. Pharm. Asso., Sci. Ed., vol. XLIV, No. 9, September 1955, pp. 540–542.

Harry: Modern Cosmet., Leonard Hill Ltd., London, 4th ed., 1955, pp. 214, 215, 225.

Peterson: J. of the Amer. Pharm. Asso., Sci. Ed., vol. XLII, No. 9, September 1953, pp. 537–540.